(12) United States Patent
Coron et al.

(10) Patent No.: US 6,990,201 B1
(45) Date of Patent: Jan. 24, 2006

(54) METHOD FOR TESTING A RANDOM NUMBER SOURCE AND ELECTRONIC DEVICES COMPRISING SAID METHOD

(75) Inventors: Jean-Sébastien Coron, Paris (FR); David Naccache, Paris (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/763,158

(22) PCT Filed: Aug. 16, 1999

(86) PCT No.: PCT/FR99/01996

§ 371 (c)(1),
(2), (4) Date: May 7, 2001

(87) PCT Pub. No.: WO00/10284

PCT Pub. Date: Feb. 24, 2000

(30) Foreign Application Priority Data

Aug. 17, 1998 (FR) ................................... 98 10592

(51) Int. Cl.
*G06F 17/00* (2006.01)
(52) U.S. Cl. .......................... 380/44; 380/46; 380/277
(58) Field of Classification Search ............ 380/44–47, 380/42–43, 28, 30, 277–279; 708/250–256
See application file for complete search history.

(56) References Cited

OTHER PUBLICATIONS

Cryptanalysis of the GST stream cipher Lee, I.; Simmons, S.; Tavares, S.;Electrical and Computer Engineering, 2003. IEEE CCECE 2003. Canadian Conference on vol. 3, May 4-7, 2003, Pages(s): 1789-1794 vol. 3.*
Design verification of the WE 32106 math accelerator unit Maurer, P.M.;Design & Test of Computers, IEEE vol. 5, Issue 3, Jun. 1988 Pages(s): 11-21.*
Entropy estimators and serial tests for ergodic chains Wegenkittl, S. ;Information Theory, IEEE Transactions on vol. 47, Issue 6, Sep. 2001 Page(s):2480-2489.*
Sadeghiyan, B. et al, *"A New Universal Test for Bit Strings"*, Lecture Notes in Computer Science, U.S. Springer Verlag, New York, New York, pps. 311-319.
Maurer, U.M., *"A Universal Statistical Test for Random Bit Generators"*, J. Cryptol (USA), Journal of Cryptology, 1992, USA, vol. 5, No. 2, 1992, pps. 89-105.

* cited by examiner

*Primary Examiner*—David Jung
(74) *Attorney, Agent, or Firm*—Buchanan Ingersoll PC

(57) ABSTRACT

The invention concerns a method for testing sources generating random numbers, particularly sources set up in the context of cryptographic systems such as random number generators incorporated in chip cards. The invention is particularly designed to be used for testing and validating electronic devices such as chip cards, PCMCIA, badges, contactless cards or any other similar portable apparatus.

10 Claims, No Drawings

METHOD FOR TESTING A RANDOM NUMBER SOURCE AND ELECTRONIC DEVICES COMPRISING SAID METHOD

This disclosure is based upon, and claims priority from, French Application No. 98/10592 and International Application No. PCT/FR99/01996, published by the International Bureau on Feb. 24, 2000 in a language other than English, the contents of which are incorporated herein by reference.

The invention relates to a method for testing sources generating random numbers, in particular sources developed in the context of cryptographic systems such as the random number generators incorporated in chip cards.

It is particularly designed to be used in the testing and validation of electronic devices such as chip cards, PCMCIAs, badges, contactless cards or any other portable apparatus.

The majority of cryptography systems of the public key type (also referred to as asymmetric cryptography) and secret key type (also referred to symmetrical cryptography) require the drawing of secret random values. It is essential that such random values, or numbers, designed to serve as keys subsequently, should a priori be unpredictable and should not exhibit any regularities making it possible to find them by strategies of exhaustive or enhanced exhaustive search, in which the most probable keys are sought first.

In this regard, there are several methods for testing the random values generated by a random source and to ensure that the said source functions correctly and does not exhibit any drift following changes in external parameters of malevolent origin, such as alteration by induced radiation.

Each of these methods applies to a series, also referred to as a sequence, of integer numbers between 0 and a value d, the said series being generated by the random source.

The most widely known test method is the so-called "frequency" test. It is a case of counting the number of appearances of each integer between 0 and a value d in the said sequence. The number of appearances of each integer is then evaluated statistically.

A second so-called "series" test method consists in a counting and statistical evaluation of the number of appearances of all the possible pairs of integers between 0 and a value d. This test method can be broadened to the counting of triplets or quadruplets of integers, etc.

A third so-called "hole" test method exists. A hole in a sequence is a series of numbers outside a predetermined interval. It is a case of a statistical evaluation of the length of the said holes in the sequence.

A fourth test method, known as the "poker" test, exist. The test consists in grouping together the numbers in the sequence in groups of five numbers and counting in each quintuplet how many different values appear.

A fifth test method, known as the "collection of coupons", consists of statistically evaluating the sequence size necessary for all the integer values between 0 and d to appear in the said sequence.

The details of these methods are found in the work by Knuth, entitled "The Art of Computer Programming, Vol. 2, Seminumerical Algorithms".

Another popular test method in Maurer's universal test described in the work "Journal of Cryptography", Vol. 5, No 2, 1992, pp 89–105. This test has the advantage of revealing all the faults detectable by the test methods previously cited as well as other statistical defects not detected by these same test methods.

The so-called Maurer test method, also referred to as the universal method, comprises the following steps:

Step one: Generation of a sequence of $(Q+K)*L$ bits by the random source. Q, K, and L are input parameters. The bits in the sequence are grouped in blocks of L bits, forming a sequence of integers between 0 and $2^L-1$ of length Q+K. The length is stored in the table block[n], where n is between 1 and Q+K.

Step two: Calculating the test parameter, denoted fTU; this second step comprising the following steps, referred to as substeps 2.1 to 2.5:

2.1 Creation and initialisation of a table tab[i] of size $2^L$;
2.2 For n varying from 1 to Q, making the calculation: tab[block[n]]=n;
2.3 Initialising the number Sum to 0;
2.4 For n varying from Q+1 to Q+K, performing the calculation:

Add log(n−tab[block[n]] to Sum;

Make the calculation: tab[block[n]]=n;

2.5 The parameter fTU of the test is given by:

$fTU=(Sum/K)/Log(2)$;

Step three: Calculation of the variance per test parameter block, denoted Var. Its precise expression is given in the article published by Maurer in the work "Journal of Cryptography", Vol. 5, No 2, 1992, pp. 89–105, which is:

$$Var = (1-z)*\sum_{i=1}^{\infty} \log2(i)^2 * z^{i-1} - \left((1-z)*\sum_{i=1}^{\infty} \log2(i)*z^{i-1}\right)^2$$

with $\log2(z)=\log(z)/\log(2)$ and $z=1-2^{-L}$

Step four: Calculation of the function of c(L,K). An approximate expression of this function is given in the article in the abovementioned work, which is:

$C(L,K)=0.7-0.8/L+(1.6+12.8/L)*K(-4/L)$;

Step five: Calculation of the standard deviation of the test parameter, denoted σ: $\sigma=c(L,K)*\sqrt{(Var/K)}$;

Step six: Calculation of the parameter y; y is determined from the rejection rate of the test fixed as an input, denoted ρ. Y must satisfy the equation:

$N(-y)=\rho$.

N is the normal density function described in the work by R. Langley: "Practical Statistics", Dover publications, New York, 1968. The equation $N(-y)=\rho$ can be resolved using a table of values of N. Such a table is supplied in the abovementioned article.

Step seven: Calculation of the ideal mean value of the test, denoted E[fTU]. Its expression is given in the article published by Maurer in the work "Journal of Cryptography", Vol. 5, No 2, 1992, pp. 89–105, and is equal to:

$$E[fTU] = (1-z)*\sum_{i=1}^{\infty} \log2(i)*z^{i-1}$$

with $\log2(z)=\log(z)/\log(2)$ and $z=1-2^L$

Step eight: Calculation of the bounds t1 and t2. They are given by the equation: $t1=E[fTU]-y*\sigma$ and $t2=E[fTU]+y*\sigma$.

Step nine: Result of the test.

If the test parameter fTU is between t1 and t2, then the random number generator is accepted. In the contrary case, it is refused.

The universal test method is therefore based on an approximation in the calculation of the function c(L,K). This approximation makes the test less precise than is wished by the theoretical guaranetee serving as a basis for it. It is possible to show that, in certain cases, the universal test proves to be 2.67 times too permissive compared with what is allowed by theory.

The object of the present invention is an improved test method for achieving the real precision guaranteed by the theoretical analysis of the universal test. This test serves notably to improve the security of portable devices of the chip card type.

The method of the invention consists in replacing step 4 of the universal test by the precise calculation of the function c(L,K). This calculation is based on a probabilitistic analysis of the universal test.

The present invention gives three distinct expressions of the function c(L,K), according to the values of the parameters L and K.

The first expression of c(L,K) is valid whatever the parameters L and K.

The second expression of c(L,K) is valid in the case where the value L is between 3 and 16 and the value K is greater than $30*2^L$, which corresponds to the most usual case of use of the test. It is much more simple to calculate than the first expression and can therefore be effected on a simple microcontroller in a few milliseconds.

The third expression of c(L,K) is valid for a value of L>16 and a value of $K>30*2^L$. This expression is even more simple to calculate.

The first expression of c(L,K) can be obtained by means of the method described below, which consists nine steps:

1. Calculation of: $u=1-2^{-L}$ and $v=1-1(2^L-1)$; u and v being real numbers;
2. Creation of two tables tab1 and tab2 of size $60*2^L$;
3. Filling of tab1 and tab2: for this purpose.
   3.1 Execute z=u, sum=0, z1=1;
   3.2 For i ranging from 1 to $30*2^L$, repeating the two operations which are: add log2(i)*z1 to sum, in which log2 designates the logarithm to base 2, and calculate: z1=z1*z;
   3.3 Execute tab1[0]=(1−z)*sum;
   3.4 For i ranging from 1 to $60*2^L$,
   Execute tab1[i]=tab1[i−1]−(1−z)*log2(i))/z,
   3.5 Repeat steps 3.1, 3.2, 3.3, 3.4, replacing u with v and tab1 with tab2;
4. Calculation of the variance per block denoted Var;
   4.1 Execute sum=0 and x=1;
   4.2 For i varying from 1 to $30*2^L$, execute the following two operations:
   Add log2(i)$^2$*x to sum and
   Execute x=x*z;
   4.3 Make Var=sum/$2^L$−tab1[0]$^2$,
5. Calculation of P(K);
   5.1 Make sum=0 and x=1;
   5.2 For i varying from 1 to $30*2^L$; carry out the following three operations:
   Calculate y:y=$u^2$*(tab2[i+K−1]−tab1[i+K])*(tab2[0]−$v^{i*tab}2[i]$)+u*tab1[0]*(tab 1[i+K−1]−tab2[i+K−1]),
   Add y*x to sum,
   Execute x=x*u;
   5.3 Execute P(K)=$u^{(K+1)}$*sum;
6. Calculation of P(1);
Same method as at step 5, replacing K with 1;
7. Calculation of Q(K):
   7.1 Make sum=0, sum2=0 x=1,
   7.2 For i varying from 1 to 30*2^L:
   Add i*log2(i)*$u^{(i-2)}$ to sum2;
   Execute the following three operations:
   Calculate y=$u^2$*(tab2[i+K−1]−tabi[i+K])*((i+k)*tab2[0]−$v^{i}$*tab2[i])−$2^{(-L)}$*sum2)+u*(i+K−1)*tab1[0]*(tab1[i+K−1]−tab2[i+K=1]),
   Add y*x to sum,
   Execute x=x*u;
   7.3 Execute Q(K)=$u^{(K-1)}$*sum
8. Calculation of Q(1)
Same method as at Step 7, replacing K with 1
9. Calculation of c(L,K)

$$c(L,K)=\sqrt{(1-2/\text{Var}*(P(1)-P(K)-(Q(1)-Q(K)/K)}$$

The second expression of c(L,K) is valid for $K>30*2^L$. It is calculated according to the following method in two steps:

Step one: Reading of the values of e(L) and d(L), e and d being real values, listed in the following table, for L between 3 and 16:

| L | d(L) | e(L) |
|---|---|---|
| 3 | 0.2732725 | 0.4890883 |
| 4 | 0.3045101 | 0.4435381 |
| 5 | 0.3296587 | 0.4137196 |
| 6 | 0.3489769 | 0.3941338 |
| 7 | 0.3631815 | 0.3813210 |
| 8 | 0.3732189 | 0.3730195 |
| 9 | 0.3800637 | 0.3677118 |
| 10 | 0.3845867 | 0.3643695 |
| 11 | 0.3874942 | 0.3622979 |
| 12 | 0.3893189 | 0.3610336 |
| 13 | 0.3904405 | 0.3602731 |
| 14 | 0.3911178 | 0.3598216 |
| 15 | 0.3915202 | 0.3595571 |
| 16 | 0.3917561 | 0.3594040 |

Step two: Calculate the value c(L,K) using the formula:

$$c(L,K)=\sqrt{(d(L)+e(L)*2^L/K)}$$

The third expression of c(L,K) is valid for L>16 and $K>30*2^L$. It is given by the following formula:

$$c(L,K)=\sqrt{(1-6/\Pi^2+2/\Pi^2*(4*\log(2)-1)*2^L/K)}$$

The present invention also relates, as started at the beginning of the description, page 1, to an electronic device which is not depicted by a figure or diagram. This electronic device is a device for the automatic verification of the physical integrity of a self-checking integrated circuit checking the integrity of its random generator from the three variants of the method of the invention, also described above, or more explicitly from the three different expressions of the function c(L,K), in order to ensure that the said generator is functioning correctly in general and does not exhibit any drift following changes in external parameters of malevolent origin, such as an alteration by induced radiation, in particular.

Preferentially, the electronic device carrying out the test is a portable device, and more particularly consists, for example, of a chip card, a contactless card, a PCMCIA cards, a badge or an intelligent watch.

Finally, the electronic device of the invention can be an external device consisting of a machine or installation designed to test the correct functioning of random generators incorporated in the said portable devices. This external device allows an exchange of information with the portable device so as to check that the random generator is functioning correctly. The external device interacts with the portable device in order to check the integrity of its random generator.

What is claimed is:

1. A method for testing a random number generator in an electronic device, comprising the following steps:

Step one: Generation of a sequence of (Q+K)*L bits by the random number generator, with Q, K and L being input parameters, the bits in the sequence being grouped in blocks of L bits, forming a sequence of integers between 0 and $2^L-1$ of length Q+K, the length being stored in a table block[n], where n is between 1 and Q+K;

Step two: Calculating a test parameter, denoted fTU according to the following substeps 2.1 to 2.5:
2.1 Creation and initialisation of a table tab[i] of size $2^L$
2.2 For n vrying from 1 to Q, making the calculation: tab [block [n]]=n;
2.3 Initialising a number of Sum to 0;
2.4 For n varying from Q+1 to Q+K, performing the calcualtion in two operations:

Add log(n−tab[block[n]] to Sum;

Make the calculation: tab[block[n]]=n;

2.5 Setting the parameter fTU of the test to be fTU= (Sum/K)/Log(2);

Step three: Calculation of the variance, denoted Var, from the following expression:

$$Var = (1-z)*\sum_{i=1}^{\infty} \log2(i)^2 * z^{i-1} - \left((1-z)*\sum_{i=1}^{\infty} \log2(i) * z^{i-1}\right)^2$$

with log2(z)=log(z)/log(2) and $z=1-2^{-L}$

Step four: Calculation of a function c(L,K);

Step five: Calculation of the standard deviation of the test parameter, denoted σ: σ=c(L.K)*√(Var/K);

Step six: Calculation of the parameter y; where y is determined from the rejection rate of the test fixed as an input, denoted ρ, and satisfies the equation:

N(−y)=ρ where N is the normal density function;

Step seven: Calculation of the ideal mean value of the test, denoted E[fTU], given by the following formula:

$$E[fTU] = (1-z)*\sum_{i=1}^{\infty} \log2(i) * z^{i-1}$$

Step eight: Calculation of the bounds t1 and t2, where t1=E[fTU]−y*σ and t2=E[fTU]+y*σ; and Step nine: Accepting the random number generator if the test parameter fTU is between t1 and t2, and rejecting the random number generator in the contrary case, wherein step four comprises a calculation of the function c(L,K) which is valid whatever the parameters L and K.

2. A method for testing a random number generator according to claim 1, wherein step four comprises a calculation of the function c(L,K) which is valid in the case where the value of L is between 3 and 16 and the value of K is greater than $30*2^L$.

3. A method for testing a random number generator according to claim 1, wherein step four consists of a calculation of the function c(L,K) which is valid for a value of L>16 and a value of K>$30*2^L$.

4. A method according to claim 1, wherein the calculation of the function c(L,K) contains nine steps:
1. Calculation of: $u=1-2^{-L}$ and $v=1-1/(2^L-1)$; u and v being real numbers;
2. Creation of two tables tab1 and tab2 of size $60*2^L$;
3.1 Initialize z=u, sum=0, z1=1;
3.2 For i ranging from 1 to $30*2^L$, repeating the two operations which are:
add log2(i)*z1 to sum, in which log2 designates the logarithm to base 2, and calculate: z1=z1*z;
3.3 Initialize tab1[0]=(1−z)*sum;
3.4 For i ranging from 1 to $60*2^L$;
Execute tab1[i]=(tab1[i−1]−(1−z)*log2(i))/z;
3.5 Repeat steps 3.1, 3.2, 3.3, 3.4, replacing u with v and tab1 with tab2;
4. Calculation of the variance denoted Var;
4.1 Initialize sum=0 and x=1;
4.2 For i varying from 1 to $30*2^L$, execute the following two operations:

Add log2(i)$^2$*x to sum and

Execute x=x*z;

4.3 Make Var=sum/$2^L$−tab1[0]$^2$;
5. Calculation of P(K), as follows:
5.1 Make sum=0 and x=1;
5.2 For i varying from 1 to $30*2^L$, carry out the following three operations:

Calculate y=$u^{2}$*(tab2[i+K−1]−tab1[i+K])*(tab2[0] −$v^i$*tab2[i])+u*tab1[0]*(tab1 [k+K−1]−tab2 [k+K−1])

Add y*x to sum,

Execute x=x*u;

5.3 Execute P(K)=$u^{(K-1)}$*sum;
6. Calculation of P(1):
Same method as at step 5, replacing K with 1;
7. Calculation of Q(K), as follows:
7.1 Make sum=0, sum2=0 and x=1,
7.2 For i varying from 1 to 32*2^L:

Add i*log2(i)*$u^{(i-2)}$ to sum2;

Execute the following three operations:

Calculate y=$u^{2}$*(tab2 [i+K−1]−tab1 [i+K])*((i+k) *tab2[0]−$v^i$*tab2[i]−$2^{(-L)}$*sum2)+$u*(i+K−1)$ *tab1[0]*(tab1 [i+K−1]−tab2[i+K−1])

Add y*x to sum,

Execute x=x*u;

7.3 Execute Q(K)=$u^{(K-1)}$*sum
8. Calculation of Q(1);
Same method as at step 7, replacing K with 1
9. Calculation of c(L,K):

c(L,K)=√(1−2)/Var*(P(1)−P(K)−(Q(1)−Q(K)/K).

5. A method according to claim 2, wherein the function c(L,K) contains two steps:

Step one: Reacting of the values of e(L) and d(L), e and d being real values, listed in the following table, for L between 3 and 16:

| L | d(L) | e(L) |
|---|------|------|
| 3 | 0.2732725 | 0.4890883 |
| 4 | 0.3045101 | 0.4435381 |
| 5 | 0.3296587 | 0.4137196 |
| 6 | 0.3489769 | 0.3941338 |
| 7 | 0.3631815 | 0.3813210 |
| 8 | 0.3732189 | 0.3730195 |
| 9 | 0.3800637 | 0.3677118 |
| 10 | 0.3845867 | 0.3643695 |
| 11 | 0.3874942 | 0.3622979 |
| 12 | 0.3893189 | 0.3610336 |
| 13 | 0.3904405 | 0.3602731 |
| 14 | 0.3911178 | 0.3598216 |
| 15 | 0.3915202 | 0.3595571 |
| 16 | 0.3917561 | 0.3594040 |

Step two:
Calculate the value c(L,K) using the formula:

$$c(L,K)=\sqrt{(d(L)+e(L)*2^L/K)}.$$

6. A method according to claim 3, wherein the calculation of the function c(L,K) is effected by means of the following formula:

$$c(L,K)=\sqrt{(1-6/\Pi^2+2/\Pi^2*(4*\log(2)-1)*2^L/K)}.$$

7. An electronic device for the self-checking of the physical integrity of a self-checking integrated circuit and checking the integrity of its random number generator, in order to ensure that the latter is functioning correctly in general and does not exhibit any drift following changes in external parameters of malevolent origin such as an alteration by induced radiation, which performs the method according to claim 1.

8. An electronic device according to claim 7, wherein the device performing the test is a portable device.

9. An electronic device according to claim 8, wherein the device is a chip card, a contactless card, a PCMCIA card, a badge or an intelligent watch.

10. An electronic device according to claim 7, wherein an external device performing the test comprises a machine or installation designed to test the correct functioning of random number generators incorporated in said portable device.

* * * * *